(12) United States Patent
Hansen

(10) Patent No.: US 7,301,110 B2
(45) Date of Patent: Nov. 27, 2007

(54) ARRANGEMENT FOR CONVEYING CONTROLLED PORTIONS OF A PRODUCT MATERIAL TO A WEIGHING SYSTEM

(75) Inventor: Henning Ingemann Hansen, Haarby (DK)

(73) Assignee: Cabinplant International A/S, Haarby (DK)

( * ) Notice: Subject to any disclaimer, the term of this patent is extended or adjusted under 35 U.S.C. 154(b) by 0 days.

(21) Appl. No.: 11/369,234

(22) Filed: Mar. 3, 2006

(65) Prior Publication Data

US 2006/0196701 A1  Sep. 7, 2006

Related U.S. Application Data

(60) Provisional application No. 60/677,524, filed on May 4, 2005.

(30) Foreign Application Priority Data

Mar. 3, 2005   (EP) .................................. 05388019

(51) Int. Cl.
*G01G 19/387* (2006.01)
*G01G 13/02* (2006.01)

(52) U.S. Cl. ..................... 177/25.18; 177/119; 222/55; 222/77

(58) Field of Classification Search ............. 177/25.18, 177/119–121; 222/55, 56, 77
See application file for complete search history.

(56) References Cited

U.S. PATENT DOCUMENTS

| | | | |
|---|---|---|---|
| 5,143,166 A * | 9/1992 | Hough | 177/128 |
| 5,340,949 A * | 8/1994 | Fujimura et al. | 177/25.18 |
| 5,379,923 A * | 1/1995 | Sagastegui et al. | 222/181.2 |
| 2005/0241916 A1 * | 11/2005 | Gentili | |
| 2005/0269367 A1 * | 12/2005 | Post | |

* cited by examiner

*Primary Examiner*—Randy W Gibson
(74) *Attorney, Agent, or Firm*—Klein, O'Neill & Singh, LLP; Howard J. Klein

(57) ABSTRACT

An arrangement for conveying product material to a weighing system includes an infeed for product material to be weighed and at least one dosing mechanism for controlled conveyor of product material portions from the infeed to a weighing system. The dosing mechanism includes a motor-driven transport screw formed as a helically-shaped rod positioned in an open trough for conveying the product material from the infeed to the weighing system, and a control unit for controlling the motor in order to deliver a desired portion of product material to the weighing system. This arrangement provides a gentle, well-defined conveyance of product materials that are not suited for vibrational conveyance or conveyance by a screw conveyor in a tubular housing.

13 Claims, 3 Drawing Sheets

ARRANGEMENT FOR CONVEYING CONTROLLED PORTIONS OF A PRODUCT MATERIAL TO A WEIGHING SYSTEM

CROSS-REFERENCE TO RELATED APPLICATION

This application claims the benefit, under 35 U.S.C. §119(e), of provisional U.S. Application No. 60/677,524, filed May 4, 2005, the disclosure of which is incorporated herein by reference.

FEDERALLY-SPONSORED RESEARCH OR DEVELOPMENT

Not Applicable

BACKGROUND OF THE INVENTION

1. Technical Field

The present invention relates to a weighing arrangement such as a multihead weigher comprising an infeed or storage hopper (both to be named as infeed) for product material to be weighed, and at least one dosing mechanism for controlled conveying of product material portions from said infeed to a weighing system.

2. Background Art

In weighing arrangements of this kind, it is known to use a dosing or batching mechanism comprising vibratory pans positioned as a trough for conveying product material from the infeed to the weighing system and to control the vibration in time and intensity in order to deliver a desired portion of product material to the weighing system. Such weighing arrangement can be used for a broad range of product materials, as long as the product materials can be conveyed by vibration in a sufficiently stable and organized manner. An alternative way of providing the delivery of desired portions of product material to a weighing system is to provide a screw conveyor in a tubular housing, which is suitable for controlled transport of particulate or pulverulent materials, such as e.g. known from EP 1 439 379. However, normal screw conveyors impose a relatively high mechanical influence on the product material. Such mechanical influence should, however, be avoided in connection with sensitive products. Thus, in connection with sensitive, sticky and/or flexible product materials, such as poultry, fish, fresh meat, marinated meat and corresponding lumpy and/or sticky materials, neither the vibrational nor the screw conveyor conveyance of the product material will be sufficiently stable, well-defined, and gentle, and will, thus, not be providing the required conveyance of these types of products.

SUMMARY OF THE INVENTION

It is the object of the present invention to provide a weighing arrangement of the kind referred to above, with which it is possible to provide a well-defined conveyance of product materials, which are not suited for vibrational conveyance. This object is achieved with a weighing arrangement for weighing sticky and/or flexible product material, such as fresh meat, marinated meat, poultry, fish and corresponding lumpy and/or sticky materials, which according to the present invention comprises:

an infeed for product material to be weighed; and
at least one dosing mechanism for controlled conveying of product material portions from the infeed to a weighing system;

wherein the dosing mechanism comprises a motor-driven transport screw formed as a helically-shaped member positioned in an open trough for conveying the product material from the infeed to the weighing system, and a control unit for controlling the motor in order to deliver a desired portion of product material to the weighing system.

The above arrangement comprises motor-driven transport screws formed as a helically-shaped member and providing a well-defined conveyance of product material from the infeed to the weighing system, even if the product material is sticky and/or flexible, or for other reasons is not suited for vibrational conveyance.

The positioning of the screw in an open trough provides a gentle conveyance, without imposing any significant mechanical influence or pressure on the product material.

BRIEF DESCRIPTION OF THE DRAWINGS

In the following detailed part of the present description, the invention will be explained in more detail with reference to the exemplary embodiment of a weighing system according to the invention shown in the drawings, in which.

DETAILED DESCRIPTION OF THE PREFERRED EMBODIMENTS

Figure 1:
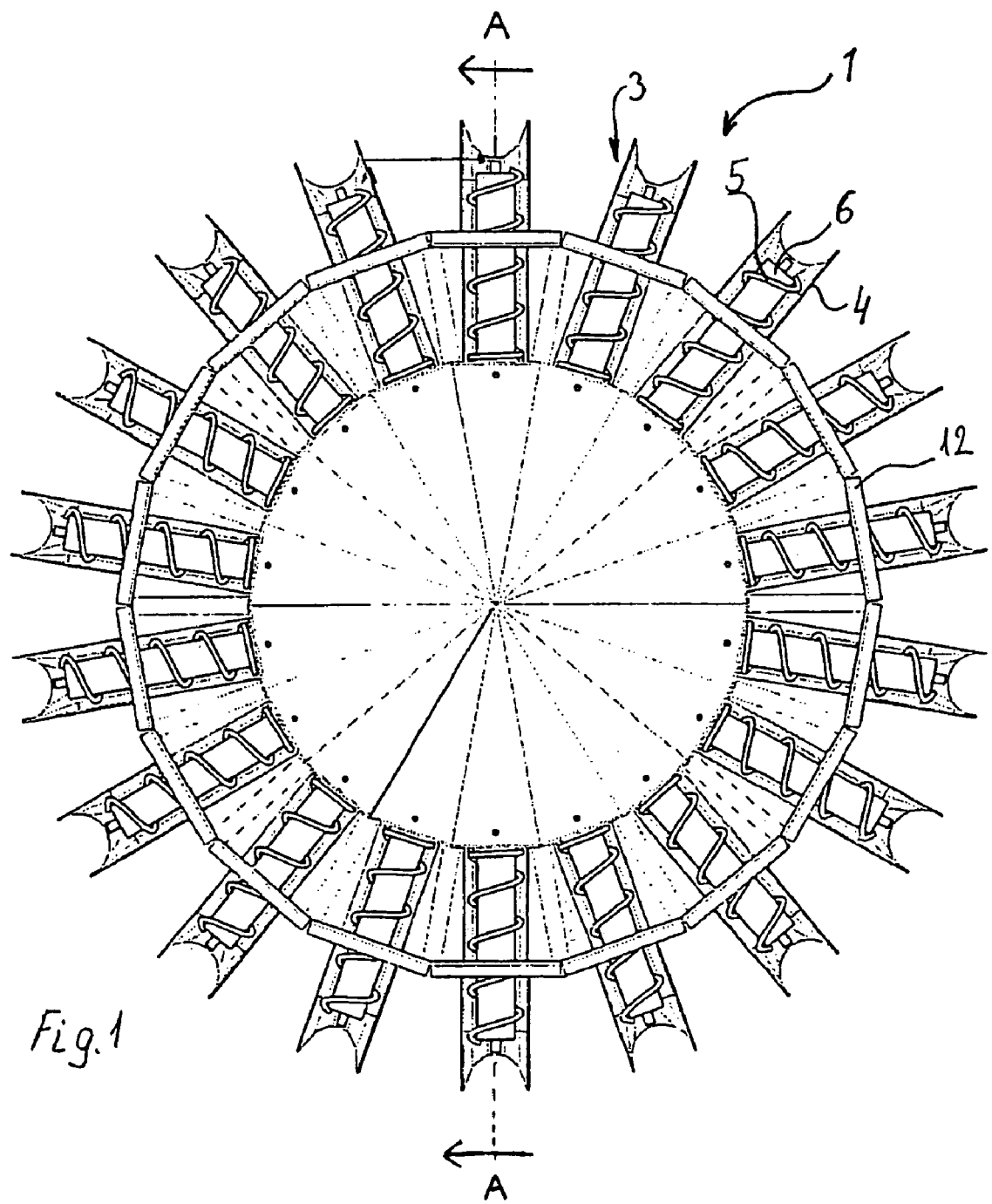
FIG. 1 shows a top view of the infeed for product material and eighteen motor-driven transport screws positioned in troughs for conveying the product material from the infeed to a weighing system.
Figure 3:
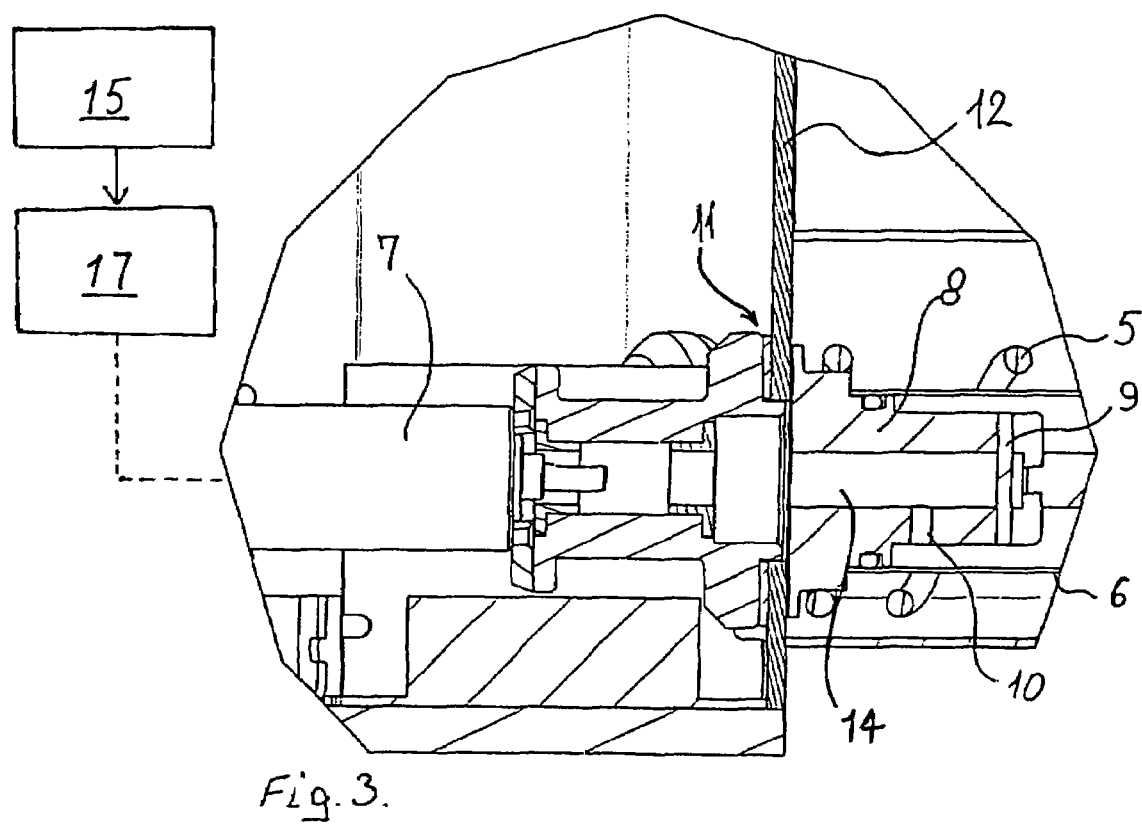
FIG. 3 shows a detail, enclosed within the circle B in FIG. 2, indicating an example of a connection between the motor and the transport screw.

The apparatus shown in FIG. 1 comprises an infeed 1 having eighteen dosing mechanisms 3 positioned symmetrically along the circumference of infeed 1. Eighteen is considered an exemplary number of dosing mechanisms, but the number in practice may be as few as two, and as many as forty or more. Each dosing mechanism 3 comprises a trough 4, in which a transport screw 5 in the form of a helically-shaped member is positioned and driven by a motor 7 (see FIG. 3). As shown in FIG. 3, the transport screw 5 is configured as a rod formed into a helix. The trough 4 comprises a bottom part with a diameter that is greater than or equal to the outer diameter of the transport screw 5. Positioned coaxially with the transport screw 5 is a core 6, which is considered to be optional, and which core 6 may have any diameter less than or equal to the inner diameter of the transport screw 5.

Figure 2:
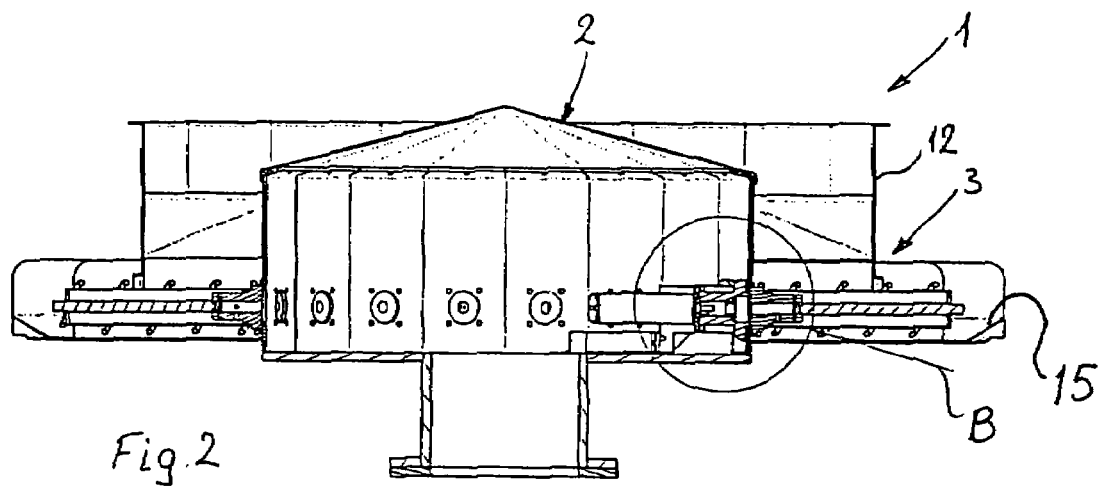
FIG. 2 shows a cross sectional view of the arrangement in FIG. 1, taken along line along line A-A of FIG. 1.

The infeed 1, shown in cross section in FIG. 2, comprises a conical central part 2, which provides a distribution of product material towards a peripheral outer wall 12 of the infeed 1. The conical central part 2 of the infeed ends at a distance from the outer wall 12 of the infeed, and therebetween the product material falls down into the individual troughs 4, in which the transport screw 5 and the optional core 6 are positioned to convey product material radially out of the infeed 1 in a controlled manner in order to deliver controlled portions of product material to a weighing system 15 positioned below the radially outer end of the troughs 4.

Preferably, the helically-shaped member of the transport screw 5 has an increasing pitch along its length in order to improve the gentle transport of the product material.

As shown in FIG. 3, the connection between the motor 7 and the transport screw 5 comprises a bushing 8 onto which the transport screw 5 is connected permanently, e.g. by welding. Alternatively, the bushing 8 may be integrated into the core 6, if the latter is present. The bushing 8 comprises a pin 9 providing a non-rotational connection to a motor-driven axle 14 and a click-connection mechanism 10, e.g. provided by means of a spring (not shown) and a ball (not shown), the ball being pressed into a recess provided in the motor axle 14. The click-connection mechanism 10 allows for ease of assembly and disassembly for cleaning, maintenance, and replacement of the transport screw 5 and/or the core 6.

The motor 7 is preferably positioned in an inner motor compartment defined within the confines of the outer wall 12 and under the conical central part 2. The troughs 4 extend through corresponding openings in the outer wall 12 of the infeed 1. In order to avoid leakage of product material from the troughs 4 into the inner motor compartment, a sealing arrangement 11 is provided between the motor axle 14 and the outer wall 12 of the trough 4.

The mounting of the motor 7, and the possible provision of supplementary bearings (not shown) for the axle 14 of the motor, are provided in a conventional way, and no detailed explanation is required at this point for those of ordinary skill in the art.

The components in contact with the product material are preferably made of stainless steel, but other materials, such as plastic, for example, can be used for different reasons.

The above-described apparatus functions in the following way: Product material to be weighed is conveyed to the infeed 1 in a controlled manner in order to keep a mainly constant level of product material in the infeed 1. The product material is distributed to the individual dosing mechanisms 3 by the conical central part 2 of the infeed. Suitable sloping surfaces between the individual troughs 4 of the dosing mechanisms 3 may be provided in order to lead the product material into the individual troughs 4. Each dosing mechanism 3 delivers predetermined portions of product material to the related weighing system 15 by signals from a control unit 17 for the overall control for the weighing arrangement. The control unit 17 is operable to control the rotational speed and/or operational duration of the motor 7 so that a controlled, well-defined portion of product material is delivered by the controlled speed of the motor 7 during a controlled period of time. In order to optimize the dosing, the subsequent weighing of the delivered portion by the weighing system provides a signal that is fed to the control unit 17, which is then operated to adjust the period of time and/or the motor speed in order to adjust the dosage of product material from each individual dosing mechanism 3.

Typical values for the rotational speed of the transport screw 5 are 10-100 revolutions per minute, and typical periods of running times are between 50 and 2000 ms.

The following weighing and combination of dosed partial portions to final portions shall be as close as possible to the desired weight of the final portions by combining a predetermined number of dosed and weighed portions, is well-known within the art, and need not be explained in further detail.

Figure 4:
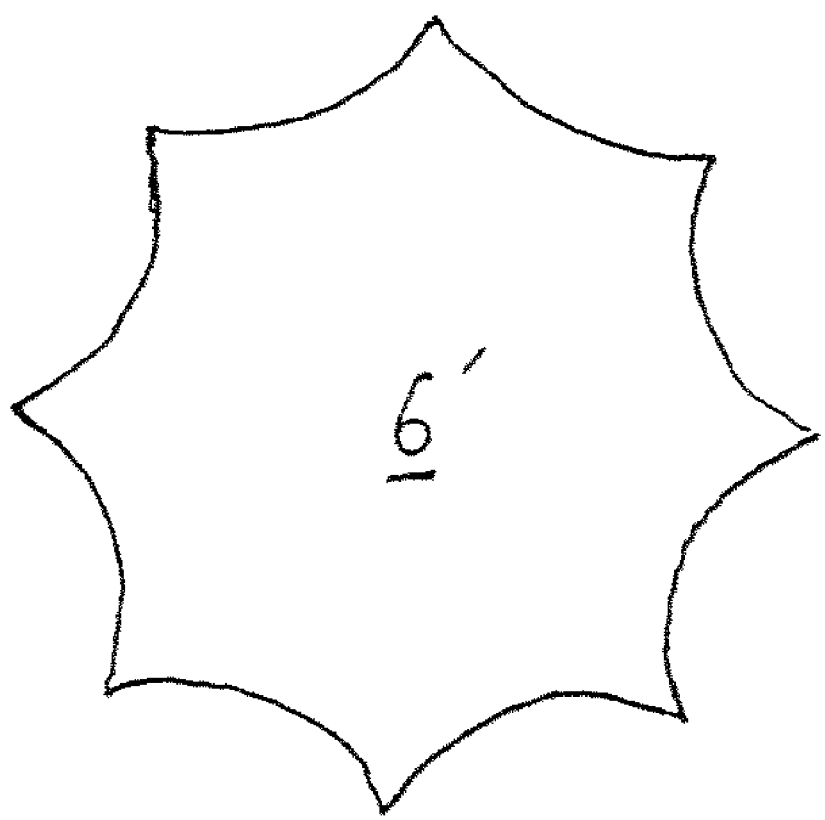
FIG. 4 is a cross-sectional view of an alternative embodiment of an optional core used in the present invention.

The invention has been described above and explained in connection with a specific embodiment thereof, as shown in the drawings; however, many variations are evident for those skilled in the art without departing from the following claims. Among such natural deviations are variations in the number of dosing mechanisms 3, the provision of cores 6 having a smaller diameter, the provision of removable or replaceable cores and/or transport screws having different diameters for conveying different products and/or providing different speeds of conveyance, and the possibility of providing the core 6 with another outer form other than the cylindrical form shown in FIG. 1, such as. for example, a core 6' (FIG. 4) with a fluted outer surface. Furthermore, the core may be kept stationary while rotating the transport screw 5 instead of being rotated synchronously with the transport screw 5. It will also be evident that the opening in the side 12 of the infeed 1, through which the trough 4 extends, has to be adapted to the product material to be conveyed by the dosing mechanism 3.

The invention claimed is:

1. An arrangement for conveying sticky and/or flexible product material to a weighing system, comprising:
    an infeed configured to hold the product material for conveyance to the weighing system; and
    a dosing mechanism operable for controllably conveying product material portions from the infeed to the weighing system, the dosing mechanism comprising:
        a trough connected to the infeed and configured to receive product material from the infeed;
        a motor-driven transport screw configured as a rod defining a helix and positioned in the trough, the transport screw being arranged and operable to convey the product material from the trough to the weighing system;
        a core having a fluted outer surface positioned inside the transport screw; and
        a control unit operable to control the driving of the transport screw so as to convey a desired portion of product material to the weighing system.

2. The arrangement of claim 1, wherein the helix defined by the rod has an increasing pitch along its length.

3. The arrangement of either of claims 1 or 2, wherein the core is rotated synchronously with the transport screw.

4. The arrangement of either of claims 1 or 2, wherein the core is kept stationary while the screw is rotated.

5. The arrangement of either of claims 1 or 2, wherein the core is a first core having a first diameter and is exchangeable with at least one second core having a second diameter different from the first diameter.

6. The arrangement of either of claims 1 or 2, wherein the transport screw has an outer diameter, and wherein the trough comprises a bottom part having a cylindrical form with a diameter equal to or greater than the outer diameter of the transport screw.

7. The arrangement of claim 6, wherein the trough extends through an opening in a side of the infeed.

8. The arrangement of either of claims 1 or 2, wherein the infeed comprises a substantially conical central part, and wherein the arrangement comprises a plurality of dosing mechanisms positioned in a circular pattern around the central part the central part being configured to direct the product material radially outward to the plurality of dosing mechanisms.

9. The arrangement of claim 8, wherein each of the dosing mechanisms comprises a transport screw and an associated motor operable to drive the transport screw, and wherein the motors are positioned under the central part.

10. The arrangement of either of claims 1 or 2, wherein the dosing mechanism further comprises:
- a motor operably connected to the transport screw so as to drive the screw; and
- a clip-on mechanism detachably connecting the transport screw to the motor.

11. The arrangement of either of claims 1 or 2, wherein the controller is operable to control the drive speed and running time of the transport screw.

12. The arrangement of claim 11, wherein the controller is operable to receive information on the weight of the product material portions, and to adjust the drive speed and running time in response to the information.

13. The arrangement of either of claims 1 or 2, wherein the arrangement comprises at least two dosing mechanisms.

\* \* \* \* \*